United States Patent [19]

Sharp et al.

[11] Patent Number: 5,729,424
[45] Date of Patent: Mar. 17, 1998

[54] AUTOGENOUS ELECTROLYTE, NON-PYROLYTICALLY PRODUCED SOLID CAPACITOR STRUCTURE

[75] Inventors: Donald J. Sharp, Albuquerque, N. Mex.; Pamela S. Armstrong, Abingdon, Md.; Janda Kirk G. Panitz, Edgewood, N. Mex.

[73] Assignee: The United States of America as represented by the United States Department of Energy, Washington, D.C.

[21] Appl. No.: 534,437

[22] Filed: Sep. 27, 1995

[51] Int. Cl.$^6$ .................. H01G 4/015; H01G 9/02
[52] U.S. Cl. .......... 361/273; 361/274.1; 361/311; 361/312; 361/323; 361/504; 361/524; 361/525
[58] Field of Search .................. 361/271–273, 361/504, 532, 523–525, 274.1, 275.1, 323, 301.1, 311, 312, 313, 314; 205/171, 322, 324; 29/25.03, 25.41, 25.42

[56] References Cited

U.S. PATENT DOCUMENTS

| | | |
|---|---|---|
| 3,249,561 | 5/1966 | Hendrix .................. 260/2.5 |
| 3,260,691 | 7/1966 | Lavin et al. .................. 260/30.2 |
| 3,483,144 | 12/1969 | Lavin et al. .................. 260/2.5 |
| 3,946,289 | 3/1976 | Yasuda . |
| 4,107,125 | 8/1978 | Lovejoy . |
| 4,705,720 | 11/1987 | Kundinger et al. . |
| 4,943,892 | 7/1990 | Tsuchiya et al. .................. 361/525 |

*Primary Examiner*—Leo P. Picard
*Assistant Examiner*—Phuong T. Vu
*Attorney, Agent, or Firm*—Armand McMillan; James H. Chafin; William R. Moser

[57] ABSTRACT

A solid electrolytic capacitor having a solid electrolyte comprising manganese dioxide dispersed in an aromatic polyamide capable of further cure to form polyimide linkages, the solid electrolyte being disposed between a first electrode made of valve metal covered by an anodic oxide film and a second electrode opposite the first electrode. The electrolyte autogenously produces water, oxygen, and hydroxyl groups which act as healing substances and is not itself produced pyrolytically. Reduction of the manganese dioxide and the water molecules released by formation of imide linkages result in substantially improved self-healing of anodic dielectric layer defects.

2 Claims, 2 Drawing Sheets

AUTOGENOUS ELECTROLYTE, NON-PYROLYTICALLY PRODUCED SOLID CAPACITOR STRUCTURE

The United States Government has rights in this invention pursuant to Contract No. DE-AC04-94AL85000 between the United States Department of Energy and Sandia Corporation.

BACKGROUND OF THE INVENTION

1. Field of the Invention

This invention relates to solid electrolytic capacitors containing a semiconducting layer such as manganese dioxide. It also relates to a method for producing improved self-healing solid capacitors.

2. Description of the Prior Art

Wet electrolyte tantalum and aluminum capacitors have been used for over 50 years. The wet aspect relates to need and provision for continuous electrolytic healing of defects in the highly stressed thin anodically grown layer in the capacitors. Traditionally, this has been accomplished by the incorporation of aqueous liquids, pastes, or gels which comprise glycols, borates, amines, and various acids or salts in their electrolytic structures. The water present in these electrolytes supplies the hydroxyl ions that are necessary to grow fresh anodic oxide at naturally occurring dielectric defect sites during manufacture and later as new defects appear during the service life of the capacitor. This permits tantalum and aluminum capacitor structures to be fabricated which operate at voltages up to 250 and 600 volts, respectively.

About 35 years ago, conductive manganese dioxide was successfully substituted as a more desirable solid or dry cathode electrolyte for tantalum capacitors. Unfortunately, the corrosive nature of the chemical reaction, i.e. the thermal pyrolysis of manganese nitrate at 200° C., necessary to form manganese dioxide in intimate contact with the anodic dielectric is quite destructive to aluminum oxide. The reaction is now used uniquely with tantalum oxide capacitor structures due to the more chemically durable oxide. This provides operating voltages up to 100 as compared to about 250 volts for the wet tantalum oxide version.

Manganese dioxide is believed to heal defects and protect the capacitor structure by two separate mechanisms: (1) manganese dioxide is thermally reduced, by the somewhat destructive heat that is released at defect sites, to form a substantially insulating "electrical patch" selective to the defect; and (2) the reduction is accompanied by the liberation of oxygen, which is also believed to contribute to the oxidative repair of the metal anode exposed by the defect. Although the solid electrolyte does not provide defect healing as efficient as in the prior wet electrolyte art, it does facilitate a useful tantalum capacitor structure capable of operating as high as 100 volts.

It is therefore an object of this invention to provide an alternative solid electrolyte system which affords the preferred gentle healing mechanism common to the higher voltage aqueous based electrolyte systems.

Another object is to provide such a solid electrolyte system which retains a similar "electrical patch" forming ability provided by manganese dioxide.

A further object is to provide a manufacturing process for forming a semiconductor-containing capacitor layer without the liberation of the corrosive by-products generally associated with the conventional processes for in situ formation of manganese dioxide.

Still another object is to provide a solid electrolyte aluminum capacitor.

Additional objects, advantages, and novel features of the invention will become apparent to those skilled in the art upon examination of the following description or will be learned by practice of the invention.

BRIEF SUMMARY OF THE INVENTION

There is disclosed herein a solid electrolyte capacitor having a valve metal anode covered with an anodic oxide film and a solid electrolyte layer disposed between that anode and a cathode. The solid electrolyte layer contains a finely divided semiconducting material dispersed in a solid partially polymerized mixture of monomers capable of releasing substances such as water and/or hydroxyl groups upon further polymerization caused by the localized heat created by defects in the anodic oxide layer. These released compounds, along with the oxygen that is produced by the reduction of the dispersed semiconducting material, re-oxidize the valve metal exposed in the defect area and thus restore the dielectric integrity of the anodic oxide, not only during manufacture but also throughout the life of the capacitor. The preferred components of the solid electrolyte layer are manganese dioxide and a polyimide made from pyromellitic dianhydride and oxydianiline. Although the polyimide is not electrically conductive, the finely divided dispersed manganese oxide is present at a concentration sufficient to allow the composite to conduct electricity.

The capacitor is assembled by first cleaning the valve metal anode, anodizing it to create the dielectric layer, applying a paste of semiconductor material and partially polymerized organic matrix, and drying the paste to form the solid electrolyte layer.

As a result of the present teachings, it is now possible to construct aluminum capacitors which benefit from the self-healing feature of wet capacitors and possess the longer useful life typical of dry capacitors. Also, dry or solid electrolyte tantalum capacitors of the present design can function at a level of up to 150 volts, as opposed to the conventional level of about 100 volts.

BRIEF DESCRIPTION OF THE DRAWINGS

The accompanying drawings, which are incorporated in and form part of the specification, further illustrate the invention and, together with the textual description, serve to explain the principles of the invention.

DETAILED DESCRIPTION OF THE INVENTION

The capacitors herein disclosed constitute a significant improvement in performance and useful life over the dry or solid electrolyte capacitors of the art. As indicated above, solid electrolyte capacitors can now be made that are superior to wet capacitors in that they may be hermetically sealed and, therefore, have a longer useful life. Also, solid tantalum capacitors can now be made without resort to the conventional fairly involved manganese dioxide generating reaction with its attendant production of poisonous and corrosive by-products. The resulting tantalum capacitors can function at voltages up to about 150 volts, as opposed to about 100 volts for the solid electrolyte tantalum capacitors of the art. The elimination of the undesirable conventional method of incorporating manganese dioxide into capacitors now makes possible the manufacture of solid aluminum capacitors containing manganese dioxide and benefitting from the presence of that material.

Figure 1:
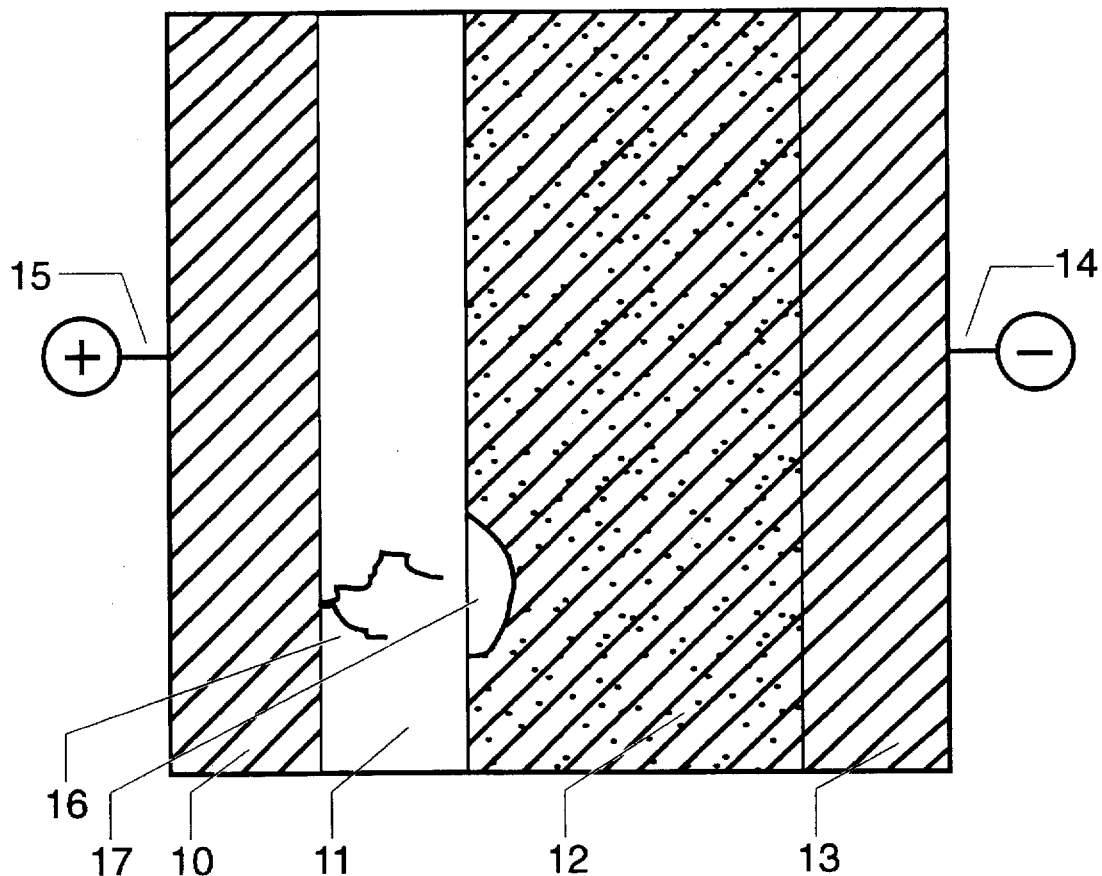
FIG. 1 is a simplified cross-sectional sketch of a solid electrolyte capacitor showing a dielectric flaw of the type which allows current leakage.

The capacitors of the invention, as shown in FIG. 1 (in this description, all part numbers refer to FIG. 1), comprise an anode made of a valve metal 10 covered by a thin layer of dielectric oxide 11 produced by conventional anodization methods. Any valve metal can be used for this purpose, including aluminum, tantalum, niobium, and the like. Aluminum or aluminum alloys are preferred. The anodization process of the valve metal is carried out under conditions and for the length of time necessary to obtain the oxide layer thickness appropriate for the desired working voltage of the capacitor. The thickness of the layer can vary generally within the range of 100 to over 5000 Angstroms, depending on the chemical nature of the oxide and the working voltage desired. Typically, for aluminum anodes, a thickness of 5000 Angstroms is preferred when a working voltage of about 250 is desired.

The solid electrolyte cathode layer 12 of the capacitors is applied on the dielectric oxide layer 11 by brushing, spraying, or dip-coating with a cathode paste, followed by drying and partial curing with applied heat to form a solid self-healing conductive manganese dioxide composite electrode structure. When the cathode paste consists of finely divided manganese dioxide dispersed in an aromatic polyimide matrix, the resistivity of cathode layer 12 is about 10 ohm-cm.

The composite cathode structure 12 is then covered with silver paste cathode contact 13 which is applied by brushing, spraying, or dip-coating a commercially available silver paste coating preparation, followed by heat curing. The resulting silver paste electrode 13 facilitates good lateral electrical conductivity or the underlying less conductive cathode paste and may also permit solder attachments such as lead 14. Alternatively, a layer of colloidal graphite particles can be applied as a paint between layers 12 and 13 to enhance the stability of the capacitor by disallowing chemical reduction of the manganese dioxide and the concurrent formation of silver oxide at the interface of layers 12 and 13. Another lead 15 is attached to the valve metal 10 to complete the capacitor structure.

The preferred composition of the solid electrolyte layer 12 consists of finely divided manganese dioxide milled to a 5 micron or less particle size, dispersed into an aromatic polyamide made by the condensation of pyromellitic dianhydride with oxydianiline. A sufficient concentration of manganese dioxide particles is used so that the polyamide paste cathode has a resistivity of about 10 ohm-cm. These materials as well as other polyamides and semiconducting species are widely available commercially. U.S. Pat. Nos. 3,260,691, 3,483,144, and 3,249,562 disclose many usable aromatic polyamide/polyimide examples of usable polymers. Conventional additives can be incorporated in the polyamide preparations in order to adjust their properties to any application at hand. For instance, a polyimide precursor resin system sold under the name of Ultradel® by Amoco Chemical Company contains a siloxane substituent which endow it with superior adhesion and higher temperature capabilities.

Also illustrated in FIG. 1 is a dielectric flaw 16 in the anodic insulation layer 11. When such a flaw exists or appears, a localized high current is produced (a leak) which induces a slow electrochemical reduction of the semiconductor in the cathode, e.g., manganese dioxide, to a lower non-conducting oxide which forms a plug 17 at the defect site and results in a subsequent high resistivity (100,000 micro-ohm-cm), thus isolating the defect from the surrounding conductive cathode. Oxygen released by the reduction reaction contributes to the healing. This healing mechanism, which is part of the prior art, still operates when the manganese oxide is dispersed in a non-conductive polymer as the present invention teaches. In addition to that, however, further healing of defects occurs when the heat created by the localized high current continues the condensation of the solid polymer, e.g., from polyamide to polyimide, releasing water in the process. This water then reoxidizes exposed valve metal, thus restoring the integrity of the dielectric layer 11. The present approach is critically dependent on the presence of an incompletely cured polymer, such as an aromatic polyamide. A fully cured polyimide binder provides inferior defect healing performance inasmuch as no water is released. Accordingly, attention must paid to the degree of polymer cure achieved during processing.

This combination of reduction and condensation reactions constitutes the crux of the present invention and, as already pointed out, it can be achieved by a number equivalent materials and combinations of materials and by appropriate variations of the processes involved. And now, to further illustrate the invention, a couple of examples are provided, which describe the manufacture of two preferred embodiments of the new capacitors. It must be kept in mind while reading these examples that they are not intended to nor do they limit the invention beyond the scope of the appended claims.

The invention will now be illustrated with some examples which describe preferred embodiments of the new capacitors.

EXAMPLE I

A—Five 6061-T6 aluminum metal coupons measuring 4×4×⅛ inches were etched for 3 minutes at 25° C. in a bath comprising 10 volume % stock concentrated hydrofluoric acid (45%) and 90 volume % concentrated nitric acid (75%). The coupons were then spray rinsed with distilled water. The 6060-T6 alloy is a strong commercial material used in the aircraft industry. It contains about 98% aluminum and small quantities of other metals such as manganese, magnesium, etc.

B—The etched coupons were anodized in a 100,000 ohm-cm aqueous ammonium pentaborate bath at a temperature of 50° C. Stainless steel cathodes of similar area were used. A constant current density of one Ma/cm$^2$ of aluminum area was maintained until a 350 volt anodic potential was attained. This voltage was maintained until a final current density of 0.1 Ma/cm$^2$ was achieved, whereupon the voltage was removed. The samples were then spray rinsed with distilled water and air dried.

C—A slurry was then prepared, the solid portion of which comprised 100 grams of manganese dioxide fine milled to less than 5 micron particle size (type HPX -500 mesh from Chem Metals, Baltimore Md.). The liquid portion comprised 30 ml of duPont Pyre ML RK-692® wire enamel, a product based on pyromellitic dianhydride and oxydianiline. Reagent grade N-methylpyrrolidone was used to thin the paste to a brushable consistency. This slurry was then brush-applied to the aluminum anodic oxide surface to a thickness of approximately 5 mils, followed by drying at 40° C. for 30 minutes. The slurry area represented about 15 square inches in order to provide a margin.

D—Solderable silver emulsion, AMICON #C159® (an acrylic silver flake paint from Emerson & Cumming, Woburn Mass.), was then brush-applied to a thickness of approximately 5 mils, followed by drying at approximately 40° C. for 30 minutes. After drying, the final cure of the coupons was carried out at 100° C. for 30 minutes. A polyimide-based material, AMICON C-940-4® "silver filled attach adhesive", can alternatively be used when device operating temperatures higher than 100° C. are required, for instance up to 200° C. with polyimide-based adhesive.

E—A nickel tab was spot-welded to the anode to serve as the positive electrode tab. A cathode electrode, e.g., silver, was solder attached to the silver paste cathode.

EXAMPLE II

Solid electrolyte capacitor structures were made according to the process of Example I, except that tantalum coupons were used instead of aluminum coupons and anodized to 250 volts.

Electrical Testing

Figure 2:
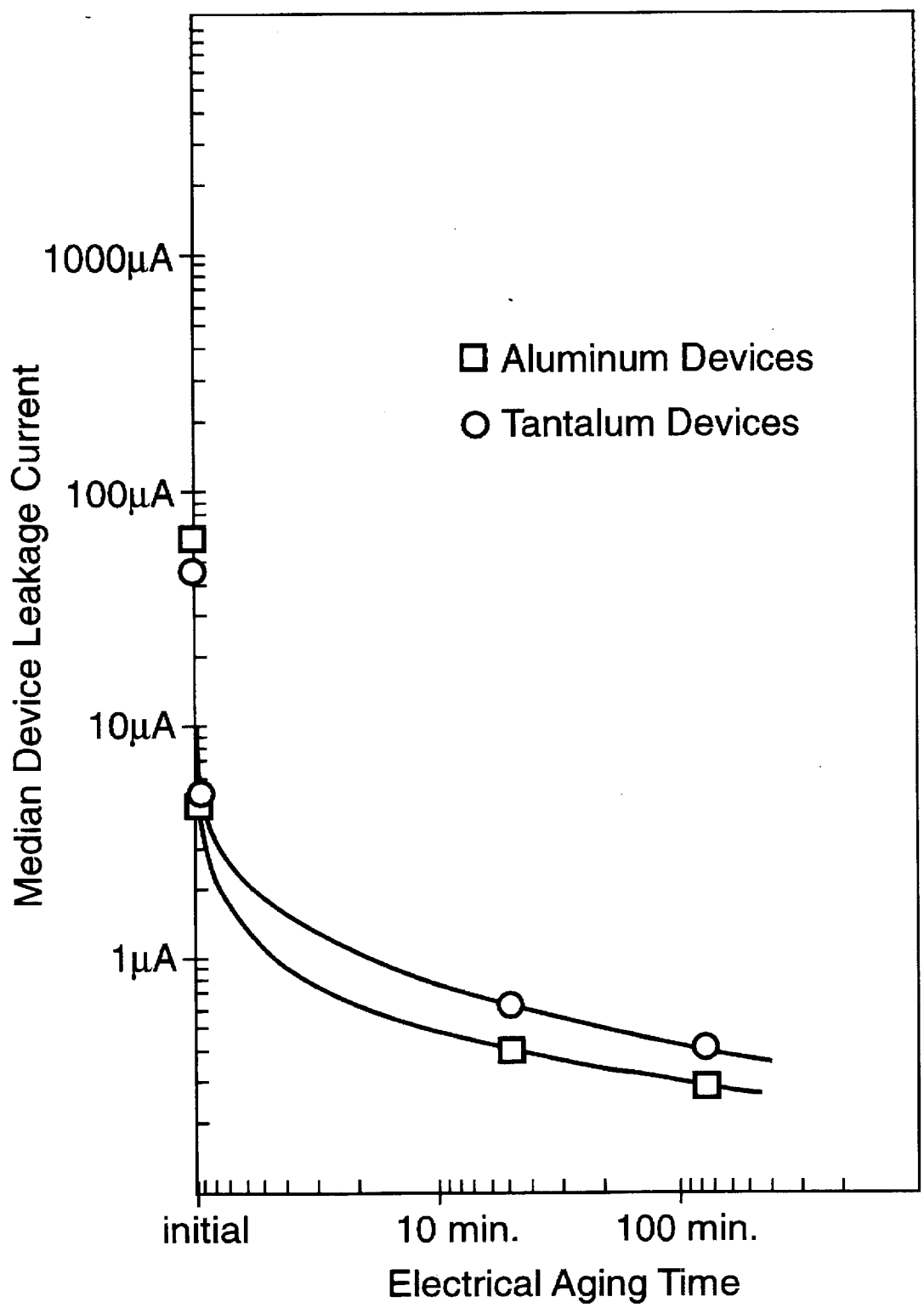
FIG. 2 illustrates the self-healing ability of the capacitors of the invention.

The capacitors of Examples I and II were tested at room temperature (23° C.) and initial median current values (leakage) of about 44 microamperes were measured at 20 volts. Within 30 seconds of the initial application of voltage, the electrical leakage values were observed to diminish to about 5 microamperes or less for both Examples I and II capacitors. Continued aging at voltage for 5 hours produced typical final leakage values of about 500 nanoamperes or less. The efficacy of the self-healing structure of the invention is clearly demonstrated by this data. Median electrical capacitance values of about 3.1 microfarads were measured at 120 Hertz for the aluminum structures. Electrical leakage values of about 290 nanoamperes and capacitance values of about 8.1 microfarads were observed for the tantalum structures. These results are plotted in FIG. 2.

EXAMPLE III

Five more aluminum capacitors were manufactured as in Example I. Their leakage and capacitance values are listed in Table 1.

TABLE 1

LEAKAGE AND CAPACITANCE VALUES - ALUMINUM DEVICES, 20 V

| Sample | Initial Leakage | 30 seconds | 60 seconds | 5 hours | Capacitance |
|---|---|---|---|---|---|
| 1 | 44 μA | 5.0 μA | 0.61 μA | 0.275 μA | 3.15 μfd |
| 2 | 32 | 4.6 | 0.53 | 0.350 | 3.25 |
| 3 | 57 | 6.5 | 0.72 | 0.615 | 3.20 |
| 4 | 62 | 6.6 | 0.80 | 0.400 | 3.30 |
| 5 | 38 | 4.3 | 0.39 | 0.525 | 3.25 |

EXAMPLE IV

Five more tantalum capacitors were manufactured as in Example 2. Their leakage and capacitance values are listed in Table 2.

TABLE 2

LEAKAGE AND CAPACITANCE VALUES - TANTALUM DEVICES, 20 V

| Sample | Initial Leakage | 30 seconds | 60 seconds | 5 hours | Capacitance |
|---|---|---|---|---|---|
| 1 | 68 μA | 4.9 μA | 0.40 μA | 0.235 μA | 8.3 μfd |
| 2 | 48 | 3.8 | 0.21 | 0.195 | 8.1 |
| 3 | 77 | 4.5 | 0.33 | 0.290 | 8.1 |
| 4 | 62 | 5.0 | 0.55 | 0.380 | 8.4 |
| 5 | 55 | 5.4 | 0.42 | 0.325 | 8.0 |

As can be seen in Tables 1 and 2, significantly rapid healing of defects takes place in solid electrolytic valve metal capacitors when the solid electrolyte layer comprises the compositions of the invention.

It will be obvious to those skilled in the art that the autogenous water generating capability of the manganese dioxide-containing polymeric composition, be it a polyimide or some other precursors capable of releasing water at dielectric defect sites, may be applied to alternate capacitor or capacitor-like dielectrics incorporating paper, polyethylene terephthalate, mica, ceramic, and the like. Applications which involve necessarily thin and therefore highly electrically stressed dielectrics, or insulating layers in general, can benefit from this new technology.

What is claimed is:

1. A solid electrolytic capacitor comprising:

a first electrode made of a valve metal having an anodic oxide film thereon, a second electrode opposite to said first electrode, a solid electrolyte layer disposed between said electrodes, said layer comprising manganese dioxide dispersed in a solid partially polymerized mixture of an aromatic polycarboxylic anhydride and an aromatic polyamine.

2. The capacitor of claim 1, wherein the polycarboxylic acid anhydride is pyromellitic dianhydride and the polyamine is oxydianiline.

* * * * *